(No Model.)

C. L. HEALY.
RELAY FOR QUADRUPLEX TELEGRAPHS.

No. 407,480. Patented July 23, 1889.

Witnesses
E. C. Rowland
William Pfzer

Inventor
Clarence L. Healy
By his Attorneys

UNITED STATES PATENT OFFICE.

CLARENCE L. HEALY, OF BROOKLYN, NEW YORK.

RELAY FOR QUADRUPLEX TELEGRAPHS.

SPECIFICATION forming part of Letters Patent No. 407,480, dated July 23, 1889.

Application filed September 15, 1888. Serial No. 285,502. (No model.)

*To all whom it may concern:*

Be it known that I, CLARENCE L. HEALY, a citizen of the United States, residing at Brooklyn, in the county of Kings and State of New York, have invented a certain new and useful Improvement in Relays for Quadruplex Telegraphs, of which the following is a specification.

My invention relates to the neutral or second side relays of quadruplex telegraphs, my object being to produce a relay which will be more effective in action and less liable to be disturbed by the reversals of the current in working the first side of the quadruplex.

The receiving-relay for the second side as heretofore constructed consisted of a yoke or horseshoe-magnet with short cores to give quickness of action. The shortest magnet that can be obtained in this form is one that if straightened out would measure over four inches in length, and of this total length the entire available space to wind the coils upon is an inch at each end, or two inches for the whole magnet, which is less than one-half the entire length of the magnet. To get the required strength, it is necessary to wind this magnet with fine wire and with a resistance as high as three hundred ohms. The length of this relay-magnet and the ineffective position of the wire coils on the core produce a falling off of the armature when the current is reversed through it by the working of the first side of the quadruplex, the relay not responding quick enough to hold its armature. This defect, it will be seen, reduces greatly the margin or extent of usefulness of the second side of the quadruplex.

The object of my invention is to overcome these defects and difficulties, and to accomplish this I do away with the yoke or horseshoe form of magnet and employ for my relay two straight magnets arranged parallel to each other and acting on two armatures mounted upon a shaft between the magnets and overlapping adjacent ends of the two magnets.

My invention consists in the novel devices and combinations of devices employed by me in accomplishing the above-named object, as hereinafter set forth, and pointed out by the claims.

Figure 1:
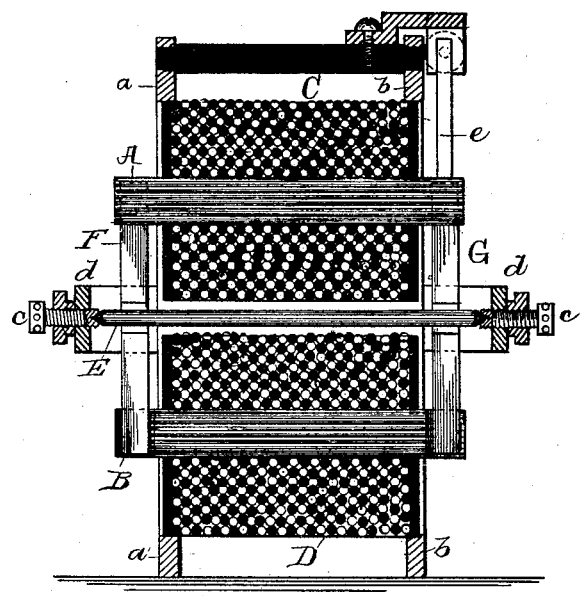
Figure 2:
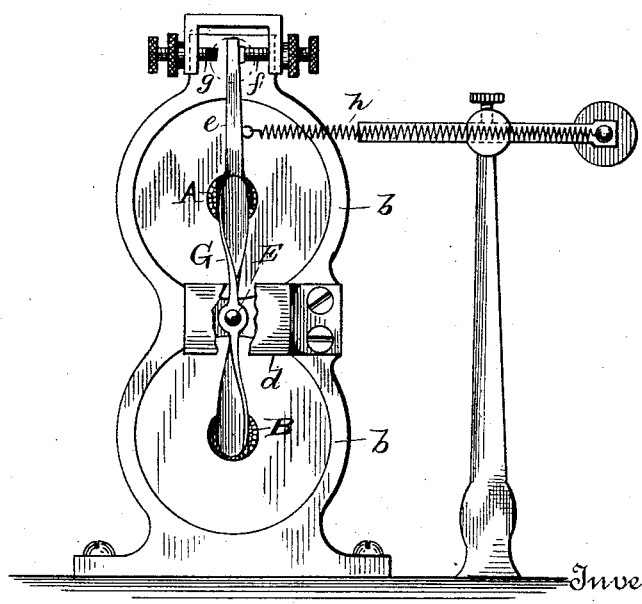

In the accompanying drawings, forming a part hereof, Figure 1 is a vertical longitudinal section of my improved relay, and Fig. 2 is an end elevation of the same.

A and B are the straight cores of the two magnets, composed of the softest iron, and preferably of iron wires, so that they will accept reversals of current rapidly and in order to reduce the self-induction to the lowest point. The ends of these cores projecting beyond the heads of the wire-space of the magnets are preferably beveled off. Each core may be about two and a half inches long and have a wire-space of two inches.

C D are the wire windings on the cores, each core having two wires wound upon it. (Represented by the solid and open circles.) The wires composing the two windings of each core to make the relay differential are preferably served upon the cores together side by side, so that the differential action will be largely directly between the currents in the windings rather than between the magnetisms produced by such currents in the cores; but these windings may be placed one over the other or upon separate longitudinal sections of the cores.

The magnets are mounted in frames $a\ b$, with their cores parallel and located one above the other. Between the magnets and parallel with the cores is a shaft E, which is held by centering-screws $c$ at its ends, passing through brackets $d$ from the frames $a\ b$.

Upon the ends of the shaft E are secured the armatures F G, at right angles to the cores, which are preferably constructed like propeller-blades and made light, especially at the extreme ends, to reduce the inertia. The ends of the armatures have the same bevel as the ends of the cores. They overlap the beveled ends of the cores and pass on opposite sides, so that the turning movement of the shaft E will cause the armatures to approach or leave both cores at the same time. These armatures act as keepers to the magnetic circuit set up in the two cores, which attract both armatures simultaneously toward them to complete the magnetic circuit, the attractive force of both cores being increased.

The armature G has an extension $e$ working between contact-points $f\ g$ and connected with an adjustable retracting-spring $h$. The wire-space extending nearly over the whole length of the core, the magnets can be wound with larger wire, giving the same resistance or a greater resistance than heretofore used, but with a greater number of convolutions. This increases the magnetic pull and reduces the lag, since there is less self-induction in the coil itself. The core being short, the reversals of magnetism take place at a much greater speed, and the time of no magnetism of the core during the time reversals are being sent is reduced one-half. So much greater is the magnetic strength of my improved relay compared with the old form and so much greater is its capacity for reversals of magnetism that it is capable of working on lines where the old form cannot be made to work at all.

What I claim is—

1. A neutral quadruplex relay having, in combination, two straight or bar electro-magnets and two movable armatures connected to move together and bridging adjacent ends of the cores of such magnets, substantially as set forth.

2. A neutral quadruplex relay having, in combination, two straight or bar electro-magnets and two armatures mounted on a shaft between the magnets and overlapping opposite ends of the cores of the magnets, substantially as set forth.

3. In a neutral relay, the combination, with magnet-cores having beveled ends, of an armature pivoted centrally and overlapping such cores, said armature having spirally-beveled ends shaped like propeller-blades, substantially as set forth.

4. The combination of the two differentially-wound straight or bar electro-magnets having cores with beveled ends, the intermediate shaft, the propeller-blade armatures, the contact-points, and retracting-spring, substantially as set forth.

5. A neutral quadruplex relay having, in combination, two straight or bar magnet-cores, a differential winding upon each of said cores, and two movable armatures connected to move together and bridging adjacent ends of said cores, substantially as set forth.

This specification signed and witnessed this 10th day of September, 1888.

CLARENCE L. HEALY.

Witnesses:
  WILLIAM PELZER,
  A. W. KIDDLE.